Figure 1:
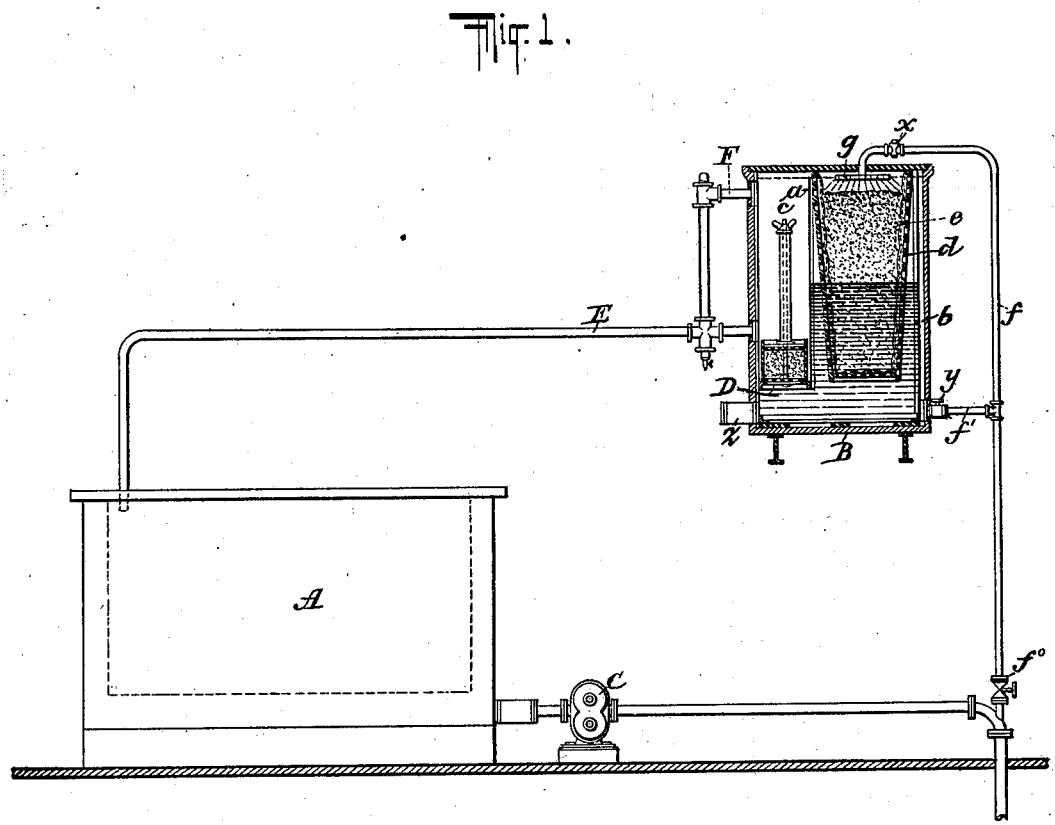

No. 664,387. Patented Dec. 25, 1900.
G. DÖDERLEIN.
REGENERATING AND FILTERING APPARATUS FOR SALT SOLUTIONS IN REFRIGERATING OR ICE MAKING MACHINES.
(Application filed Oct. 13, 1900.)

(No Model.) 2 Sheets—Sheet 1.

WITNESSES:

INVENTOR
Gustav Döderlein
BY Briesen J Knauth
ATTORNEYS

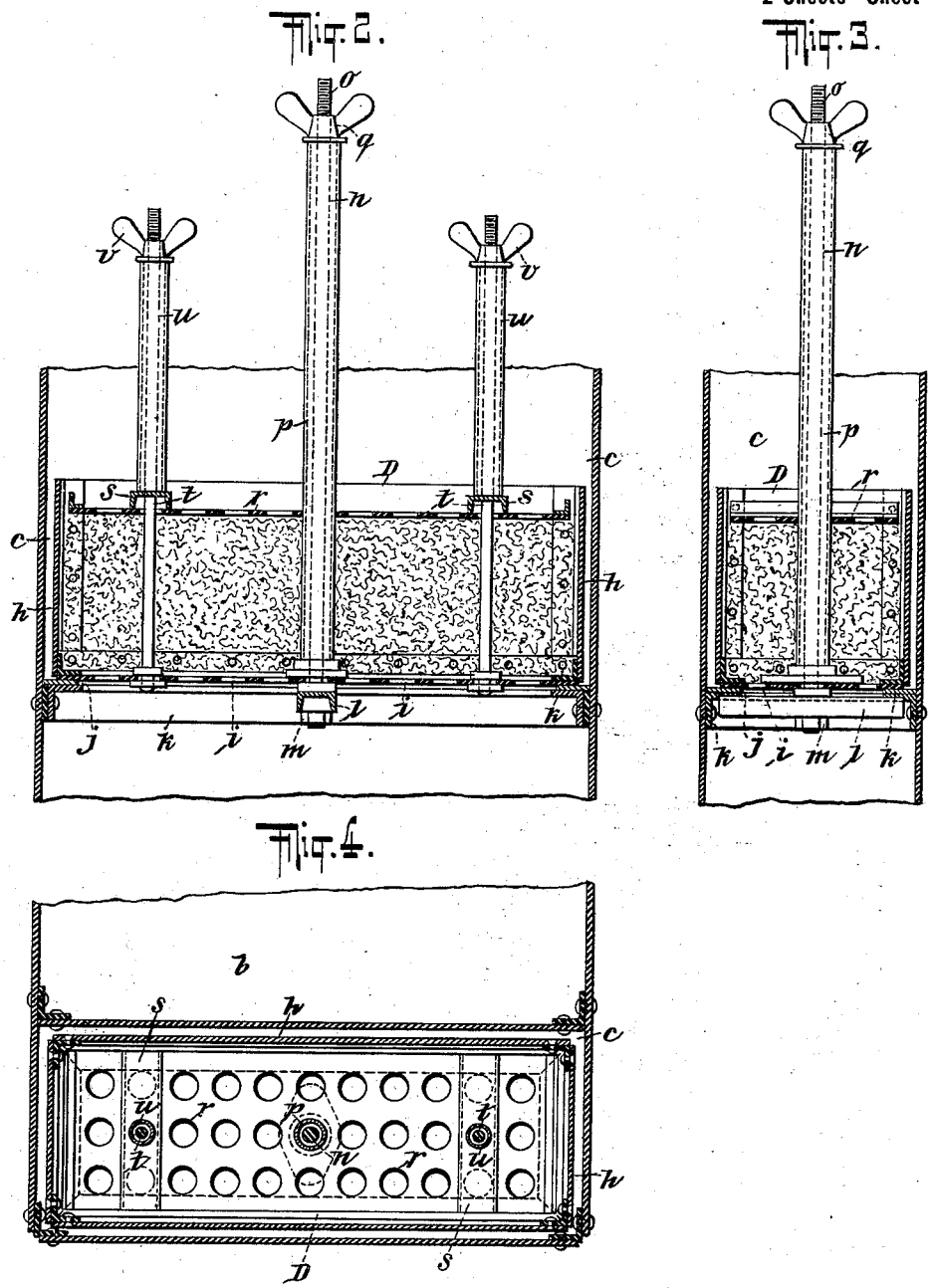

UNITED STATES PATENT OFFICE.

GUSTAV DÖDERLEIN, OF CARLSRUHE, GERMANY.

REGENERATING AND FILTERING APPARATUS FOR SALT SOLUTIONS IN REFRIGERATING OR ICE-MAKING MACHINES.

SPECIFICATION forming part of Letters Patent No. 664,387, dated December 25, 1900.

Application filed October 13, 1900. Serial No. 32,931. (No model.)

*To all whom it may concern:*

Be it known that I, GUSTAV DÖDERLEIN, ingenieur, a subject of the King of Bavaria, and a resident of Carlsruhe, in the Grand Duchy of Baden, Germany, have invented new and useful Improvements in Regenerating and Filtering Apparatus for Salt Solutions in Refrigerating or Ice-Making Machines, of which the following is a clear and complete specification.

The apparatus forming the subject of this invention has for its object, in refrigerating and ice-making machines for breweries and cold-storage installations, both to regenerate to a regular degree of saturation the salt solution or brine, which becomes weakened by constantly taking up water, and thereby to render it impossible for the coils of the vaporizer to become frozen by reason of the presence of a weak salt solution, and also to prevent the generator and the vaporizing-coils from becoming incrusted with residues from the salt, this being effected by filtering the brine before it enters the generator in order to retain all those impurities which are particularly damaging to the pumps.

The apparatus consists of two compartments arranged one under the other and in communication with one another. Of these two compartments the one which serves to receive the salt is lined with fabric and is formed of perforated sheet metal, the said compartment being connected, both above and below the salt-container, to a branch from the brine-pump, the said branch being provided with regulating devices. The other compartment contains a removable filter, and above the said filter is provided with a pipe in communication with the generator, so that a part of the brine which is kept in circulation by the pump must always pass through the two compartments, whereby the liquid can be brought to the required degree of saturation and the impurities retained by the filter.

In the accompanying drawings I have illustrated an example apparatus constructed according to the invention, and wherein—

Figure 1 is a side view, partly in section, of an apparatus embodying my invention. Fig. 2 is a vertical sectional view of a portion of the same on an enlarged scale. Fig. 3 is a like view of the same, taken at right angles to the view represented in Fig. 2 of the drawings. Fig. 4 is a horizontal sectional view of the same.

A, Fig. 1, indicates the generator of a refrigerating-machine, and B the wooden chamber of the regenerating and filtering apparatus, the said chamber being lined with sheet metal and being divided into two unequal compartments $b$ and $c$ by a sheet-metal partition $a$, which does not reach to the bottom of the said chamber. In the compartment $b$ there is arranged a container $d$, of perforated sheet metal, which is lined with an easily-permeable cloth $e$ and is designed to receive the salt. This container $d$ can be secured in the compartment $b$ in any suitable manner.

C indicates a pump which serves for the circulation of the brine and from which a branch pipe $f$, having a regulating-cock $f^0$, passes to the compartment $b$. This branch pipe $f$ opens through a spraying device $g$ into the upper part of the salt-container $d$, the contents of which, therefore, are sprinkled with the brine, and also through a branch pipe $f'$ underneath the salt-container $d$. $x$ and $y$ are cocks which serve for regulating the flow of the brine into the upper and lower part of the compartment $b$, and $z$ is a device which enables the vessel B to be emptied when necessary.

At a certain distance from the bottom of the vessel B the filter D is removably fitted in the compartment $c$, and this compartment above the filter D is placed in communication with the generator A by means of a pipe E.

F is an overflow-pipe.

The filter, which is shown in detail in Figs. 2 and 4, consists of a sheet-metal case $h$, adapted to receive the filtering material and provided with a perforated bottom $i$, the whole of the periphery of which is supported upon a frame $k$, formed of an angle-iron and riveted to the wall of the compartment $c$, a felt packing $j$ being arranged between the said bottom and the support. The said support is strengthened by a U-shaped cross-piece $l$, riveted to it, and to the latter there is secured a vertical rod $n$ by means of a nut $m$, which said rod is provided at its upper end with a screw-thread $o$. The rod $n$ passes through a tubular socket $p$, secured to the perforated bottom $i$ of the sheet-metal case $h$. By means of a nut $q$ upon the upper part of the rod $n$ downward pressure can be exerted upon the socket $p$, so that the periphery of the bottom $i$ is pressed tightly against the felt packing $j$. The filtering medium—such as wood, wool, &c.—which is introduced into the case $h$ is retained therein by a perforated cover $r$, and upon the latter there rest two U-shaped cross-pieces $s$, through each of which there passes a rod $t$, which is screw-threaded at its upper end and is secured to the perforated bottom $i$. By means of sleeves or sockets $u$ upon the upper parts of the rods $t$ and of nuts $v$ it is possible to exert a pressure upon the cross-pieces $s$, and thereby the cover $r$, so that the latter retains the filtering medium in the case $h$ and prevents it from being dislodged.

The operation of the apparatus is as follows: The liquid, which is conveyed to the apparatus through the branch pipe $f$ from the pump C, enters for the greater part through the cock $x$ into the upper part of the compartment $b$ and sprinkles the salt contained in the chamber $d$, whereby a constant solution of the salt is obtained and the brine brought to the proper degree of saturation. All impurities are retained by the filter D and collect upon the bottom of the chamber B. They can be removed by taking out the parts of the apparatus and sprinkling the sheet-metal chamber B with clean water, so that the impurities are easily conveyed away through the discharge device $z$.

By adjusting the cock $f^0$ an overflowing of the apparatus can ordinarily be avoided. Should, however, the liquid rise above the normal in the compartment $b$, no overflow can take place, by reason of the fact that the excess liquid flows away through the pipe F, under which a suitable receiving-vessel can be arranged.

The fabric lining of the compartment $d$ prevents the passage of particles of salt into the under part of the compartment $b$. Should, however, such particles succeed in passing through and the brine by reason of its liquid being too highly saturated deposit salt in the under part of the compartment $b$ by crystallization, the said salt is dissolved by the unsaturated liquid entering through pipe $f'$, so that this deposit in no way interferes with the operation of the apparatus.

By loosening the nut $q$ the filter can be easily removed from the compartment $c$ and the filtering material renewed, this being easily effected by loosening the nuts $v$ and removing the sockets $u$, cross-pieces $s$, and the cover $r$.

What I claim is—

1. A regenerating and filtering apparatus for salt solutions for use in refrigerating and ice-making machines, consisting of two closed compartments in communication with one another, one of the said compartments having a salt-container of perforated sheet metal lined with a suitable fabric and being in communication both above and below the salt-container with a branch from the liquid-pump having a regulating device, while the other compartment contains a removable filter and is, above the said filter, in communication with the generator, substantially as, and for the purpose, hereinbefore described.

2. A regenerating and filtering apparatus for salt solutions for use with refrigerating and ice-making machines, consisting of two closed compartments in communication with one another, one of the said compartments having a salt-container of perforated sheet metal lined with a suitable fabric, and being in communication with a branch from the liquid-pump having a regulating device, while the other compartment contains a removable filter which consists of a sheet-metal case containing filtering material and having a perforated bottom and a perforated cover adjustable by means of screw devices, the bottom of the said case being pressed against a rigid frame or support having a felt packing by means of a socket upon the cover and a rigid rod, substantially as, and for the purposes, hereinbefore described.

In witness whereof I have hereunto signed my name, this 21st day of September, 1900, in the presence of two subscribing witnesses.

GUSTAV DÖDERLEIN.

Witnesses:
 AMAND RITTER,
 GEO. GIFFORD.